United States Patent
Petty et al.

(10) Patent No.: US 7,713,648 B2
(45) Date of Patent: May 11, 2010

(54) FUEL CELL COVER PLATE TIE-DOWN

(75) Inventors: Dale W. Petty, Wallingford, CT (US);
Cynthia M. Phillips, Chicago, IL (US);
Jeffrey G. Lake, Vernon, CT (US)

(73) Assignee: UTC Power Corporation, South Windsor, CT (US)

( * ) Notice: Subject to any disclaimer, the term of this patent is extended or adjusted under 35 U.S.C. 154(b) by 290 days.

(21) Appl. No.: 11/880,505

(22) Filed: Jul. 23, 2007

(65) Prior Publication Data
US 2009/0029232 A1 Jan. 29, 2009

(51) Int. Cl.
*H01M 2/08* (2006.01)
*H01M 2/14* (2006.01)
*H01M 2/00* (2006.01)

(52) U.S. Cl. .............................. 429/37; 429/38; 429/36; 429/34

(58) Field of Classification Search ........................ None
See application file for complete search history.

(56) References Cited

U.S. PATENT DOCUMENTS

| 7,241,526 B2 | 7/2007 | Petty et al. | |
| 2005/0208362 A1* | 9/2005 | Petty et al. | 429/37 |
| 2006/0093890 A1* | 5/2006 | Steinbroner | 429/37 |

* cited by examiner

*Primary Examiner*—Melvin C Mayes
*Assistant Examiner*—Sheng Han
(74) *Attorney, Agent, or Firm*—M. P. Williams

(57) ABSTRACT

A pair of reactant cover plates, e.g., fluid manifolds or protective covers (11, 12), on opposite sides of a fuel cell stack (7) are drawn to the fuel cells (14) and pressure plates (8) by tensioning lines, e.g., cables (23) or straps (23*a*), which may extend around structures, e.g., pins or extensions (11*a*, 12*a*; 11*e*, 12*e*) extending outwardly from the ends of the cover plates or guides (22*a*) on the stack, e.g., on the pressure plates in a closed loop, and are tensioned by a tensioning device, such as a turnbuckle (24).

3 Claims, 6 Drawing Sheets

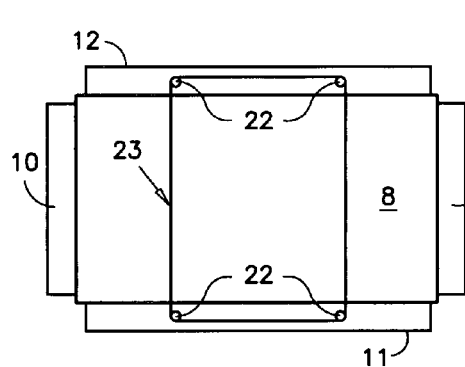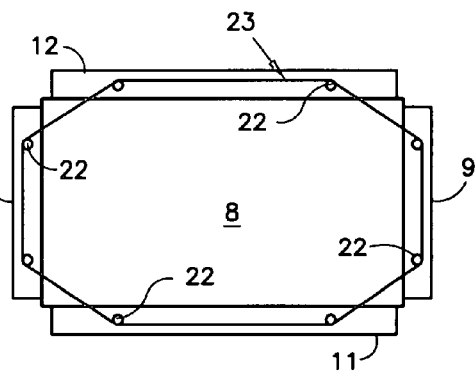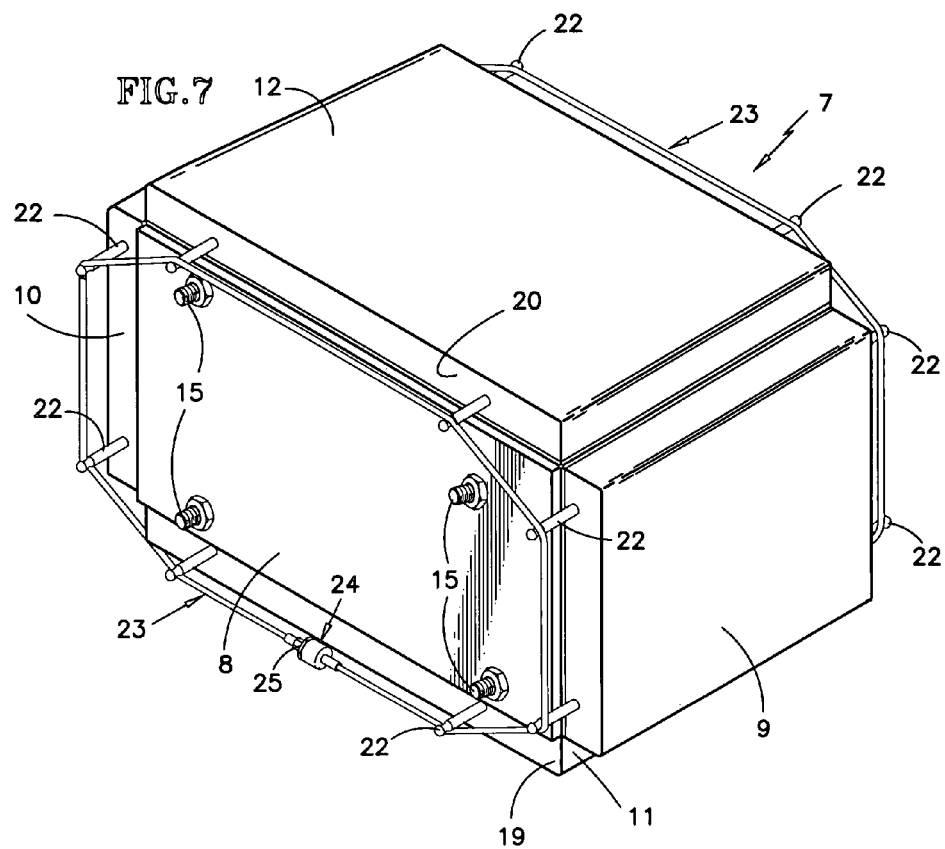

FUEL CELL COVER PLATE TIE-DOWN

TECHNICAL FIELD

Cover plates on fuel cell stacks, which may be either protective covers or fluid manifolds, are drawn into sealing relationship with the stack by means of one or more tensioning lines, such as cables, applying tension between structure on the cover plate, such as pins, or between structure on the cover plate and structure on an adjacent end plate of the fuel cell stack.

BACKGROUND ART

A fuel cell stack, part of a fuel cell power plant known to the prior art, is illustrated in FIG. 1. The fuel cell stack 7 includes a pressure or end plate 8, a fuel inlet/outlet manifold 9, a fuel turn manifold 10, and air/coolant inlet/outlet manifold 11 and an air turn manifold 12. The manifolds 9-12 are sealed to the edges of the fuel cells 14 and the edges of the pressure plate 8 by means of foam gaskets, silicone rubber, and possibly other components, examples of which are shown in U.S. Pat. No. 7,112,384. The pressure plates are drawn together by tie rods 15, as is known the manifolds are pressed to the stack by load cables or straps 17. The air/coolant manifolds experience leakage near the center line of the stack 18 because the manifolds have a low profile (that is, a low top-to-bottom height as seen in FIG. 1) and are therefore not stiff enough to counter the seal preload and stack pressure loads, thereby deflecting enough to leak in the center.

In motor vehicle applications, the volume of the fuel cell power plant is severely limited so that the size of the manifolds as well as any corrective equipment, such as clamps is highly restricted.

SUMMARY

Structures extending outwardly from ends of fuel cell cover plates, such as protective covers and fluid manifolds, engage at least one tensioning line for drawing the cover plate into secure engagement with the fuel cell stack. The structures may be pins which have grooves, somewhat like pulleys, so as to retain the tensioning line, or lips, ledges, extensions, etc. The tensioning line may be joined into a complete loop by an adjustable tensioning device, with a lock to hold the adjustment, once made.

The tensioning line may draw structures of one cover plate toward structures of a similar cover plate on an opposite side or adjacent sides of the stack, or the tensioning line may draw a structure on a cover plate toward a guide disposed on the fuel cell stack itself, such as on an end plate.

Apparatus for binding a cover plate, such as a protective cover or a fluid manifold, to a stack in a fuel cell power plant has a very low volume, provides no increase in volume to a fuel cell power plant, does not impede access to other components mounted on the fuel cell stack, requires minimum machining, is easy to assemble and to retrofit onto existing fuel cell stacks, and may apply an easily adjusted clamping force.

The structures do not increase the overall length of the fuel cell stack because they are located between gas and water inlet and outlet pipes which extend outwardly from the fuel cell stack. The clamping force is easily adjustable by a turnbuckle. The line may comprise plastic or plastic coated wire rope, thereby providing a measure of electrical insulation with respect to adjoining parts. If desired, the tensioning line can be tailored to allow pressure relief in response to detonation events.

Other variations will become apparent in the light of the following detailed description of exemplary embodiments, as illustrated in the accompanying drawings.

BRIEF DESCRIPTION OF THE DRAWINGS

FIG. 5 is a simplified line drawing of the arrangement in FIG. 2.

FIG. 6 is a simplified line drawing of the arrangement described with respect to FIG. 7.

FIG. 7 is a simplified, stylized perspective view of a short fuel cell stack having all of the manifolds sealed to the stack by a single tensioning line on each end of the stack.

MODE(S) OF IMPLEMENTATION

Figure 1:
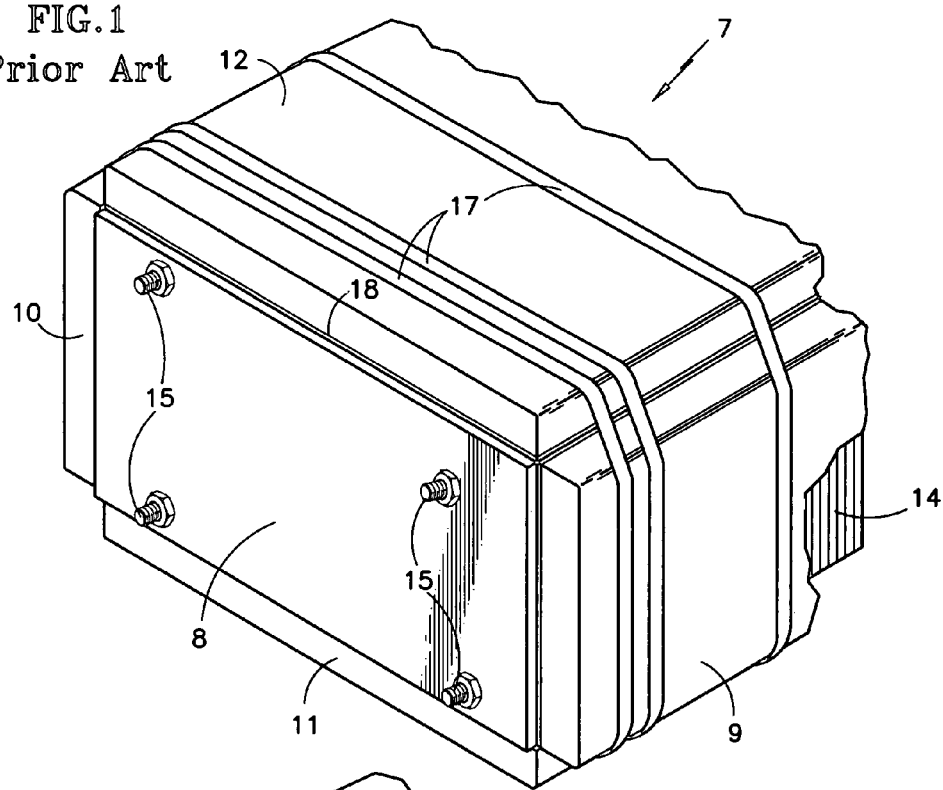
FIG. 1 is a fragmentary, partially broken away, simplified, stylized, perspective view of a fuel cell stack having manifolds which may leak.
Figure 2:
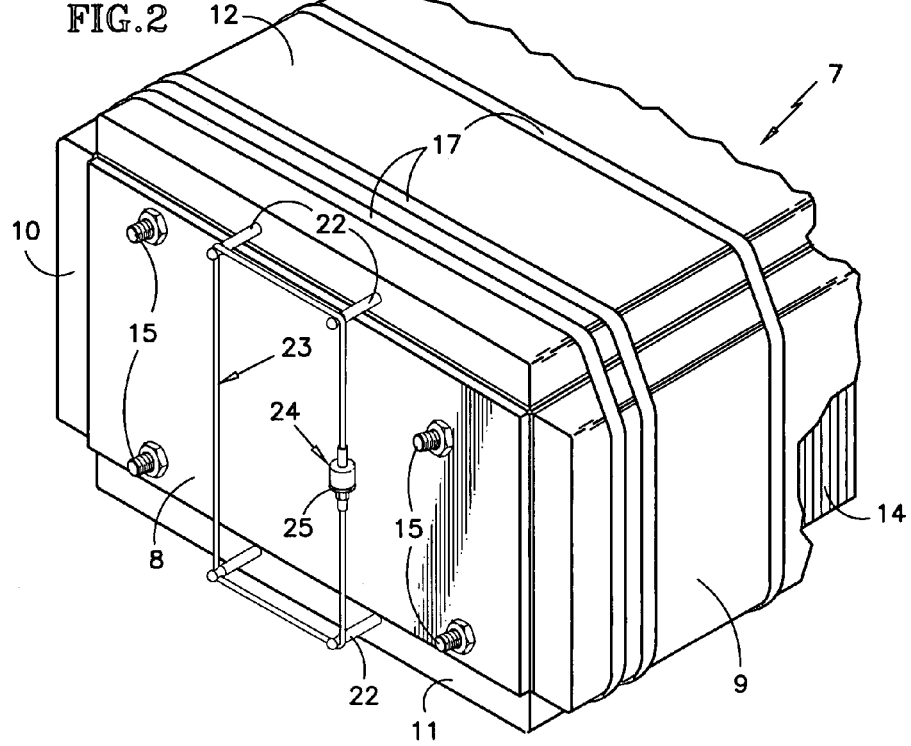
FIG. 2 is a fragmentary, partially broken away, simplified, stylized, perspective view of a fuel cell stack having pins and a tensioning line to bind the manifolds tightly to the stack.

Referring to FIG. 2, four structures comprise grooved pins 22 which are bonded into holes provided in the ends 19, 20 of the manifolds 11, 12; a tensioning line comprises a cable 23 wrapped around the pins 22 and closing upon itself at a tensioning device which comprises a turnbuckle 24 with a locknut 25.

The structures (pins) may be located wherever there is room for them and the tensioning line (cable) without interfering with other parts of the fuel cell stack. In fact the pins or other structures on one end of the stack do not have to be symmetrically aligned with the pins or other structures on the other end of the stack; the pins may be closer together on one end of the stack than they are on the other end of the stack. Similarly, pins or other structures on a cover plate need not be symmetrical with guides, pins or other structures to which they are to be drawn by a tensioning line.

If desired, and if proper spacing and clearance can be provided without interference with other apparatus on the pressure plates 8, the invention may be practiced utilizing a single pin 22 extending outwardly from the end of each related manifold; however, a pair of pins are preferred to provide adequate clearance for the turnbuckle for simple adjustment of the tension in the cable.

Figure 3:
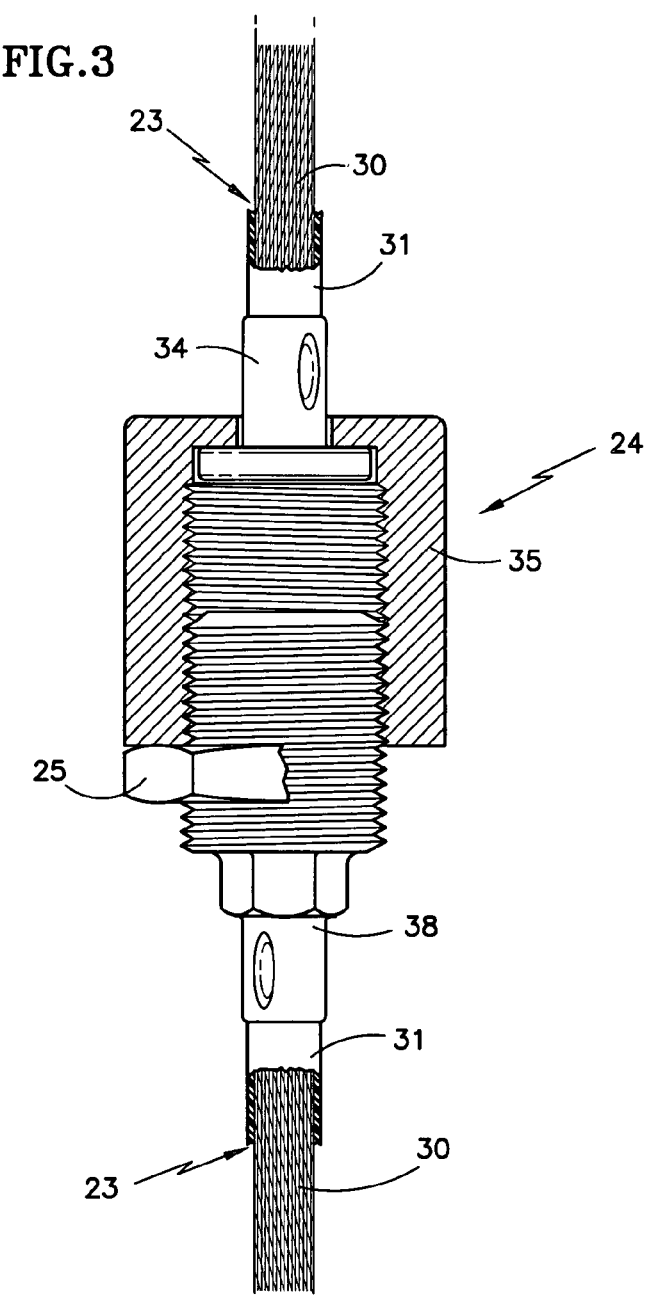
FIG. 3 is a partially sectioned, side elevation view of a turnbuckle and cable.
Figure 4:
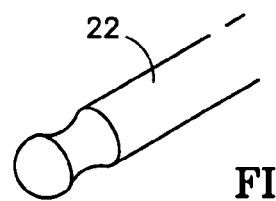
FIG. 4 is a fractional perspective view of a pin for use in the configuration of FIG. 2.
Figure 8:
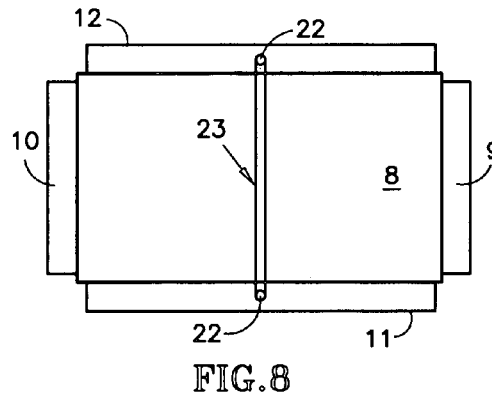
FIGS. 8-13 are simplified line drawings of other exemplary arrangements of tensioning line 23 and structures 22 which may be utilized when appropriate.
Figure 11:
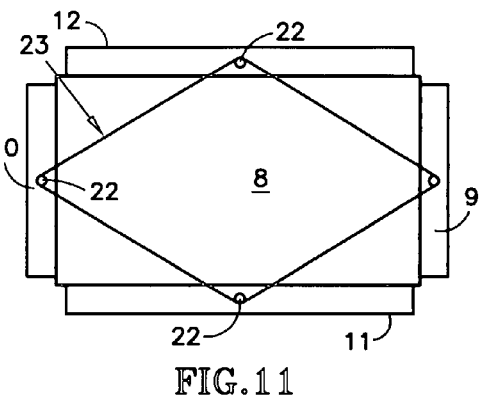

The turnbuckle 24 and lock nut 25 are illustrated in more detail in FIG. 3. The clamping cable 23 comprises a wire cable 30 with insulation 31 thereon. A collar 34 is crimped onto the cable 23 after a hollow threaded turnbuckle nut 35 is slipped over the collar. The turnbuckle nut 35 is free to rotate about the collar 34. A threaded stud 38 is crimped onto the other end of the cable and the lock nut 35 is threaded thereon. Thereafter, the turnbuckle nut 35 is threaded onto the stud 38 until the desired tension has been achieved. A pin 22 is shown enlarged in FIG. 4.

Figure 9:
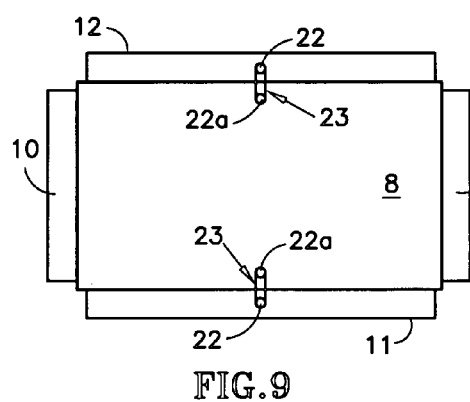
Figure 12:
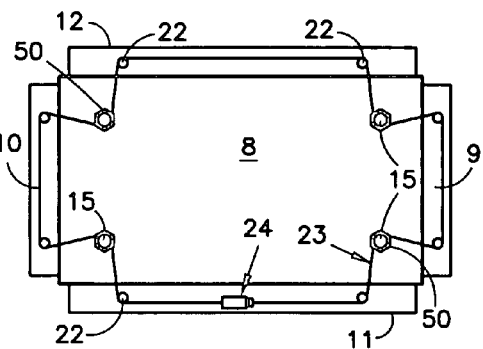
Figure 10:
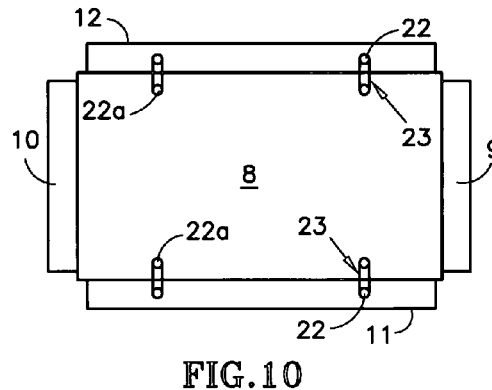
Figure 13:
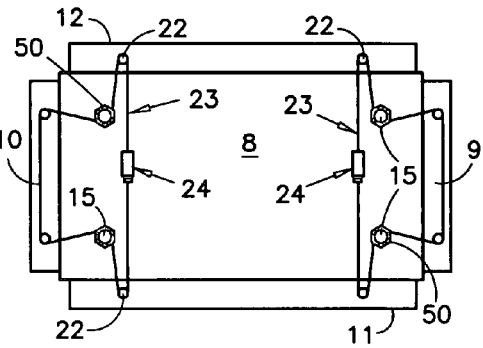

FIG. 5 is a simplified line drawing illustrating the embodiment described hereinbefore with respect to FIG. 2, with the tensioning device 24 omitted for clarity. FIG. 6 is a simplified line drawing of another embodiment which may be useful in situations, such as a very short stack having only a few fuel cells, as might be utilized in telecommunications and other low power applications. A short stack in which all of the manifolds are held to the stack by means of pins 22, the cable 23, and a tensioning device 24, on both the front and back faces of the stack, is illustrated in FIG. 7. The arrangement of FIG. 7 avoids the use of load cables 17. This has an advantage in that there may be penetrations through the manifolds which do not leave space for the cables 17. FIGS. 8-11 illustrate additional configurations of pins 22 and cables 23. FIGS. 9 and 10 illustrate that the tensioning line 23 may extend between guides 22a disposed on the stack (such as on the end plate 8) as well as structures 22 disposed on the manifolds 11, 12. The guides may be slipped over the tie bolts 15 perhaps held by additional nuts, or may be otherwise secured in place.

Figure 14:
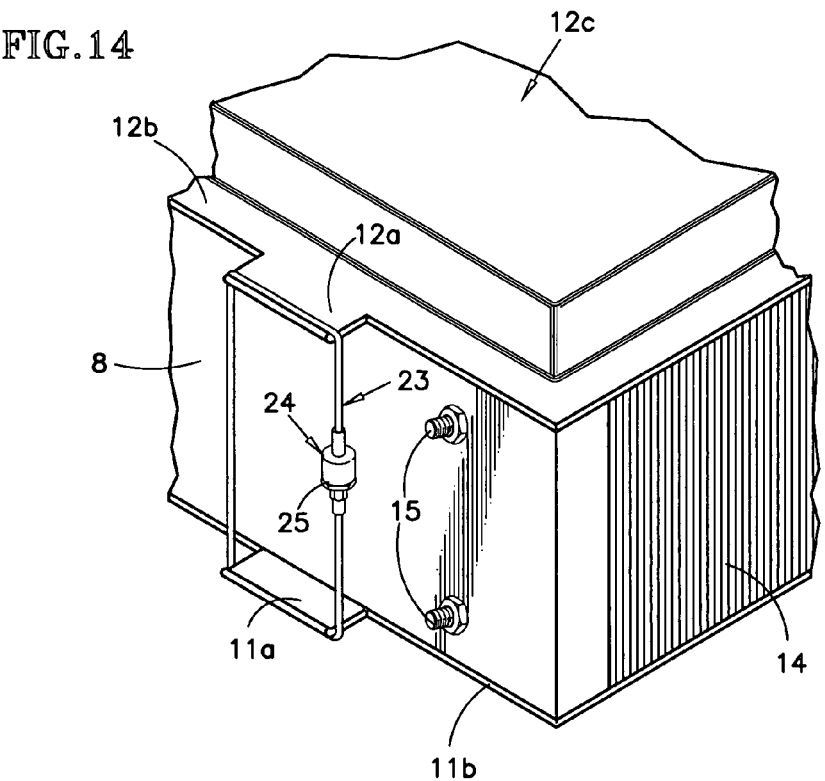
FIG. 14 is a fragmentary, simplified, stylized perspective view of a fuel cell stack in which the tensioning line is looped around structures which comprise extensions of a manifold lip.

FIG. 14 is a fragmentary perspective illustrating that the tensioning line 23 may be looped about extensions 11a, 12a in lips 11b, 12b in manifolds 12c. (In FIG. 14, the manifold 9 has been omitted for clarity.)

Figure 15:
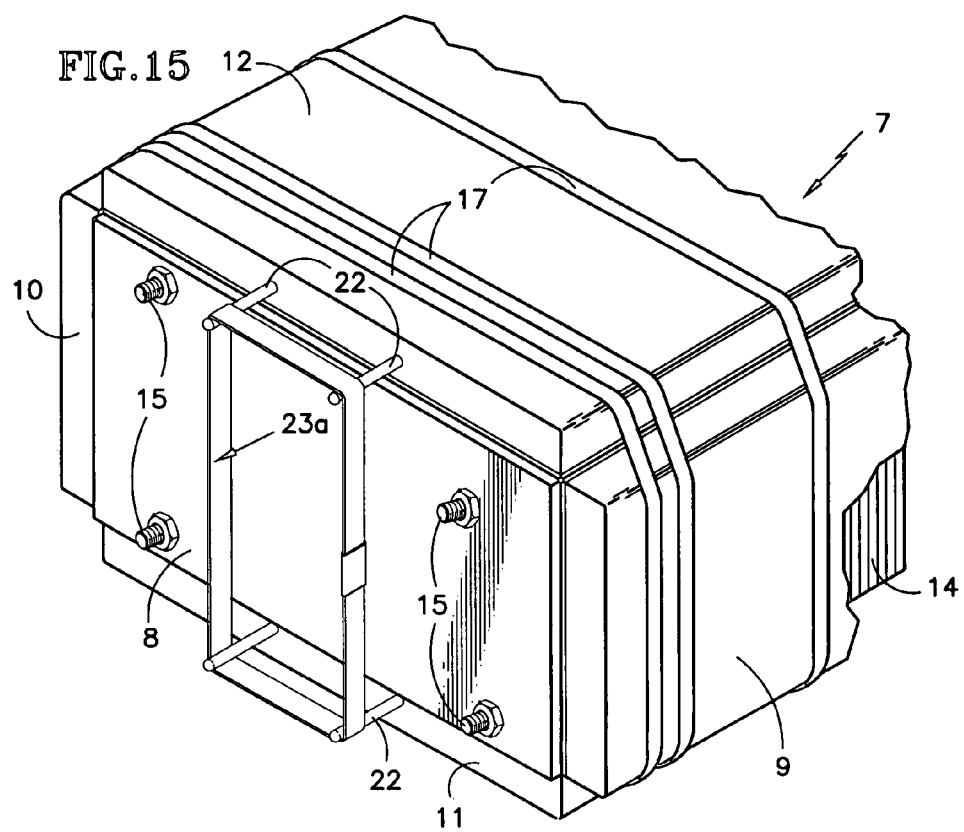
FIG. 15 is a fragmentary, partially broken away, simplified, stylized, perspective view of a fuel cell stack illustrating that the tensioning line may be a strap.

FIG. 15 illustrates that the tensioning device 23a may be a strap-like device, similar to the load cables 17, or similar to cargo crate straps or hose clamp type of straps.

Figure 16:
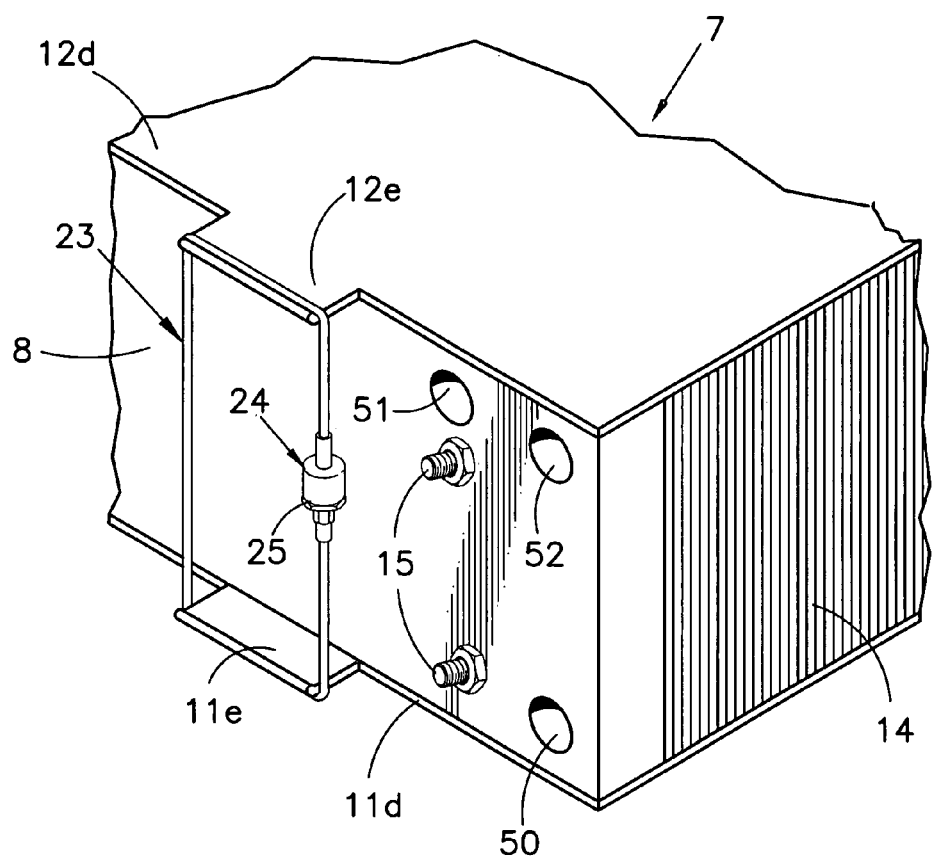
FIG. 16 is a fragmentary, simplified, stylized perspective view of a fuel cell stack illustrating that cover plates other than manifolds may be drawn to the stack by means of tensioning lines looped around structures, such as extensions of protective covers.

FIG. 16 illustrates that the cover plates other than manifolds 11, 12 may comprise protective covers 11d, 12d drawn to the stack 7 by tensioning line 23 which is looped around extensions 11e, 12e of the protective covers 11d, 12d. This arrangement will be particularly useful when internal fluid manifolds 50-52 are utilized. The protective covers 11d, 12d will provide mechanical protection, but may be sealed to the edges of the fuel cells 14 and the end plates 8 to prevent entrance of unwanted gases or particulates into the fuel cells 14.

Instead of a coated cable, the tensioning line may be a solid wire; a plastic, woven wire; a steel or composite strap; or other suitable line; and the term "tensioning line" is herein defined as any line which can transmit tension to the structures. The term "structure" is herein defined to include pins, posts, screws, bolts, eyelets, brackets, lips, extensions, or any other structure on the manifolds which can support the tension provided by the tensioning line, such as the cable 23.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell stack comprising:
    a plurality of contiguous fuel cells compressed between pressure plates into a fuel cell stack;
    at least one pair of cover plates disposed on opposite sides of said fuel cell stack, said cover plates each having a respective end adjacent to each one of said pressure plates, said cover plates having surfaces contiguous with (a) said pressure plates and (b) edges of said fuel cells;
    at least one structure extending outwardly from each end of each of said cover plates; and
    a tensioning line extending under tension between each said at least one structure and at least one guide disposed on a corresponding one of said pressure plates.

2. A method for a fuel cell stack comprising a plurality of contiguous fuel cells compressed between pressure plates, at least one pair of cover plates disposed on opposite sides of said fuel cell stack, said cover plates each having a respective end adjacent to each one of said pressure plates, said cover plates having surfaces contiguous with (a) said pressure plates and (b) edges of said fuel cells; said method comprising:
    providing at least one structure extending outwardly from each end of each said respective cover plate; and
    extending a tensioning line under tension between each said at least one structure and at least one guide disposed on said pressure plate.

3. A method according to claim 2 wherein said step of providing comprises:
    providing said at least one structure extending outwardly from an edge of a corresponding end surface, said end surface being adjacent to and perpendicular to a related one of said pressure plates.

* * * * *